Oct. 25, 1966     D. I. GORDON ET AL     3,281,289

METHOD OF PRODUCING MAGNETIC CORES

Filed July 31, 1964

Daniel I. Gordon
Robert S. Sery
         INVENTORS.

BY

ATTORNEY.

AGENT

United States Patent Office 3,281,289
Patented Oct. 25, 1966

3,281,289
METHOD OF PRODUCING MAGNETIC CORES
Daniel I. Gordon, Chevy Chase, and Robert S. Sery, Silver Spring, Md., assignors to the United States of America as represented by the Secretary of the Navy
Filed July 31, 1964, Ser. No. 386,801
7 Claims. (Cl. 148—103)

The invention described herein may be manufactured and used by or for the Government of the United States of America for governmental purposes without the payment of any royalties thereon or therefor.

The present invention relates to a method for treating materials of high magnetic permeability in such a manner as to increase the steepness of the magnetization curves and accentuate the rectangularity of the hysteresis loops exhibited by these materials.

Magnetic materials having rectangular hysteresis loops are extensively used in modern electronic components, such as magnetic memory devices, and magnetic amplifiers, for example. Materials having this property have been produced in the past by applying a magnetic field to the material during a high temperature annealing process, by grain orientation obtained by drastic cold rolling reduction prior to final annealing, or by irradiating a material with neutrons derived from a nuclear reactor while in the presence of a strong magnetic field. The first two of the aforementioned methods require high temperature sources to produce the desired effects upon the magnetic materials; while the third mentioned method involves the use of a nuclear reactor which is a relatively expensive process. Moreover a magnetic core which is so treated becomes radioactive and therefore demands the taking of all protective measures to prevent or minimize exposure of personnel to radiation and accordingly limits the utility of the magnetic core. The present invention produces magnetic materials having rectangular hysteresis loops by bombarding the material with electrons in the presence of an applied magnetic field while cooling the material to maintain its temperature below the temperature at which permanent heat treatment effects occur, thus eliminating the use of high temperatures and expensive nuclear reactors.

It is an object of this invention to provide a new method for treating materials of high magnetic permeability to increase the steepness of the magnetization curves exhibited by these materials.

Another object of the invention is to provide a new method of treating materials of high magnetic permeability to exhibit hysteresis loops which are substantially rectangular.

Figure 1:
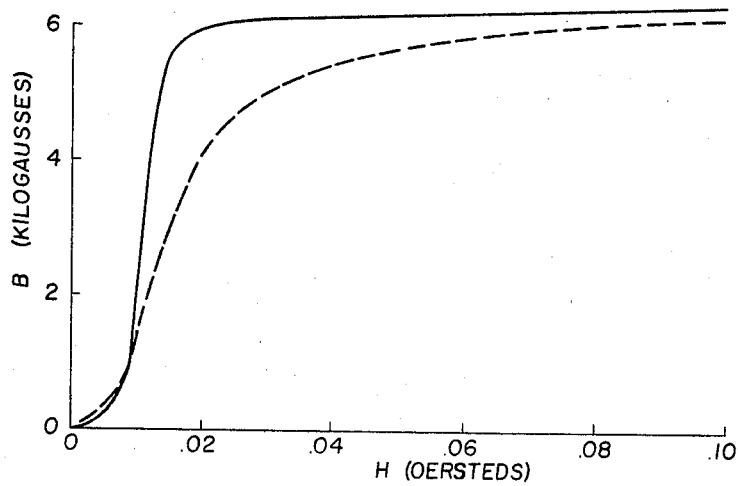
Figure 2:
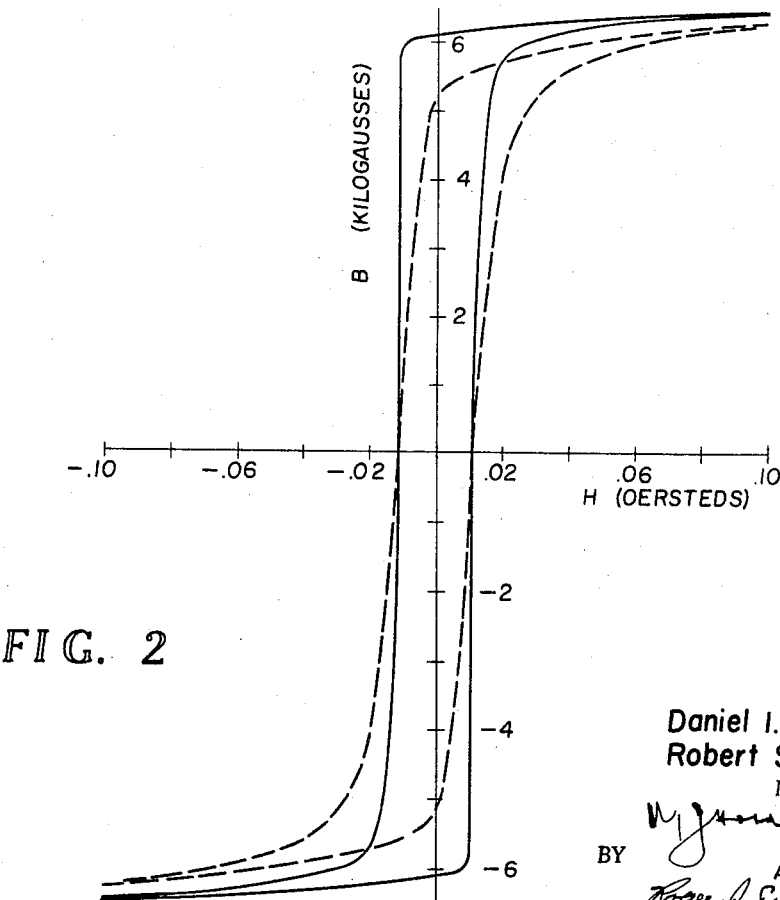

Other objects, advantages and novel features of the invention will become apparent from the following detailed description of the invention when considered in conjunction with the accompanying drawings wherein:

FIG. 1 illustrates a graph showing the increased steepness of the magnetization curve exhibited by a specific material which was treated according to the method of this invention, and FIG. 2 shows a graph displaying the hysteresis loops of a magnetic core both before and after being treated according to the method of this invention.

It has been found that an electron beam having an energy level of at least 0.5 mev. will, when directed upon magnetic materials, change the magnetic properties of said materials. As a result of this process, certain of the atoms in the crystal lattice of the material are dislodged from their normal position when bombarded by an electron beam, thus changing the ordering of the material and imparting to the material the characteristics of having a steep magnetization curve and a rectangular hysteresis loop. It has further been found that when a magnetic material is bombarded by an electron beam in the presence of a strong magnetic field, the change in the magnetic properties of the material is even more pronounced and that the material will exhibit an even steeper magnetization curve and a hysteresis loop which is substantially more rectangular. In the practice of this invention, magnetic materials, such as most binary or ternary alloys of iron, cobalt, and nickel, including those alloys with small additions of other elements such as molybdenum, as well as many ferrites, are irradiated with electrons from a suitable electron source, such as a Van de Graaf accelerator, for example, in the presence of an applied magnetic field while maintaining the temperature of the materials generally low with respect to the ordering temperature of the material, i.e., maintaining the temperature of the material below that temperature at which permanent heat treatment effects are produced.

By way of example, a punched ring of 5-80 MoPermalloy (5% molybdenum, 80% nickel and 15% iron) was treated according to the method of this invention in the following manner: flat punched rings of 5-80 MoPermalloy having inner diameters of 5/8 inch and outer diameters of 13/16 inch and being .006 inch in thickness were preliminarily heat treated to reduce the coercive force of the magnetic rings to approximately 0.01 oersted. The rings were placed on a flat target holder consisting of an aluminum block which was electrically grounded to serve as an electron collector for the electron beam derived from a Van de Graaf accelerator. The aluminum block was provided with internal passages formed therein to permit the flow of a coolant therethrough and thus provided means to dissipate the heat generated by the bombardment of the rings by the electron beam and thereby maintain the temperature of the rings substantially below the ordering temperature thereof. A magnetic field was created around the rings by passing a D.C. current through aluminum wires which were respectively positioned coaxially within each of the rings and attached to the aluminum block, which served as a return path for the D.C. current. A magnetic field of 0.22 oersted was established around each wire and ring and the rings were simultaneously irradiated by electron beam for a period of 100 minutes. During the irradiation, the coolant was passed through the aluminum block to maintain the temperature of the rings below 110° C. and the total electron dose was $1.1 \times 10^{17}$ electrons/centimeter$^2$. Now referring to FIG. 1, wherein the dotted line curve represents the magnetization curve of the ring of 5-80 Mo-Permalloy prior to treatment in the manner described above and the solid line curve represents the ring's magnetization curve after treatment according to the method of this invention, it is apparent that the treatment substantially increased the maximum slope of the magnetization curve. Referring to FIG. 2, wherein the hysteresis loop for the ring measured prior to treatment in the manner described above is shown in dotted line form while the ring's hysteresis loop measured after irradiation is shown in solid line form, it may clearly be seen that the magnetic properties of the core material have been appreciably altered by the method of this invention and that the material now exhibits a hysteresis loop which approaches rectangularity to a far greater degree than the hysteresis loop exhibited by the material prior to treatment. It is noted specifically that the hysteresis loop exhibited by the material after treatment has undergone an increase in remanence without any accompanying increase in coercive force.

The specific method described above is intended to be no more than an example and is not intended to restrict the invention to the values and ranges specified. Some of the facts which may be selectively varied to change the resultant characteristics of the cores treated according to the method of this invention are the energy level of the electron beam, the current of the electron beam, the period of irradiation, the temperature of the core material, the dimensions of the core, the strength of the induced magnetic field, the structure of the target holder, and the means and method of inducing the magnetic field.

As seen from the drawings and the above description of the invention, the method of this invention produces magnetic cores having steep magnetization curves and increases the rectangularity of the hysteresis loops of a highly permeable magnetic material without increasing the coercive force of said magnetic material. The treatment described is conducted at ordinary temperatures and requires only a relatively short processing time to produce a magnetic core which has the desired characteristics but *is not radioactive.*

Obviously many modifications and variations in the present invention are possible in the light of the above teachings. It is therefore to be understood that within the scope of the appended claims the invention may be practiced otherwise than as specifically described.

What is claimed is:

1. A method of treating a magnetically permeable material to improve the rectangularity of the hysteresis loop exhibited by said material comprising the steps of
    subjecting the material to bombardment by an electron beam while said material is positioned in a saturated magnetic field, and
    cooling the material during the bombardment to maintain the temperature of the material below its ordering temperature, until the material exhibits a rectangular hysteresis loop.

2. A method of treating a magnetically permeable material to improve the rectangularity of the hysteresis loop exhibited by said material comprising the steps of
    establishing a saturated magnetic field around said material, and
    simultaneously irradiating the material with electrons while cooling the material to maintain the temperature of the material below 250° C. until the material exhibits a rectangular hysteresis loop.

3. The method of claim 2 wherein the energy level of the electrons is at least 0.5 mev.

4. The method of claim 2 wherein the temperature of the material is maintained below 170° C.

5. A method of treating a high permeability non-grain-orientated sheet of magnetic material to improve the rectangularity of the hysteresis loop exhibited by said material comprising the steps of
    establishing a saturating magnetic field in said sheet of material, irradiating the material with an electron beam of at least 0.5 mev. while the material is positioned in the saturated magnetic field, and
    cooling the material during the irradiation to maintain the temperature of the material below 250° C. until the material exhibits a rectangular hysteresis loop.

6. The method of claim 6 wherein the strength of the magnetic field is at least 0.22 oersted.

7. A method of treating a flat sheet of 5–80 MoPermalloy containing 5% molybdenum, 80% nickel, and 15% iron and being approximately .006 inch in thickness to improve the rectangularity of the hysteresis loop exhibited by said sheet comprising the steps of
    establishing a saturating magnetic field of at least .22 oersted in said magnetic material, and
    irradiating the material with an electron beam of 2.0 mev. while said material is positioned in the saturated magnetic field for a period of approximately 100 minutes, and
    cooling the material during the electron irradiation to maintain the temperature of said material within the range of 60° C. to 110° C. thus improving the rectangularity of the hysteresis loop of said material without increasing the coercive force of the material.

References Cited by the Examiner

UNITED STATES PATENTS

| | | | |
|---|---|---|---|
| 2,968,723 | 1/1961 | Steigerwald | 148—1.5 |
| 3,113,055 | 12/1963 | Schendler et al. | 148—103 |
| 3,192,078 | 6/1965 | Gordon et al. | 118—103 |

DAVID L. RECK, *Primary Examiner.*

N. F. MARKVA, *Assistant Examiner.*